3,636,097
ISOLATION OF MALIC ACID FROM TOBACCO
William R. Harvey, Midlothian, Va., assignor to
Philip Morris Incorporated, New York, N.Y.
No Drawing. Filed Dec. 17, 1969, Ser. No. 885,963
Int. Cl. C07c *51/48*
U.S. Cl. 260—527 R    8 Claims

ABSTRACT OF THE DISCLOSURE

Natural, *l*-malic acid and salts thereof are obtained in good yield from bright tobacco parts by extraction of water-solubles including malic acid and water soluble pectins. This is followed by enzymatic de-esterification of pectins fractions under mildly acid conditions. Pectin degradation products are removed. Neutralization with an alkaline earth metal oxide or hydroxide yields the *l*-malic acid as the corresponding salt. Conventional treatment permits isolation of the *l*-malic acid.

---

This invention relates in general to the isolation of malic acid from vegetable substances and more particularly to a process for obtaining *l*-malic acid or a salt thereof from tobacco parts.

Malic acid, having an asymmetric carbon atom, is obtained in racemic form when produced synthetically. In such form and due to its ease of manufacture, it is widely used in commercially prepared foods mainly for flavoring and as an acidulant. On the other hand, *l*-malic acid which is present in many vegetable substances could be substantially competitive with the synthetic product if it could be produced at lower costs than is presently the case. This has been pointed out, for example, in "Encyclopedia of Chemical Technology," Kirk-Othmer, 2nd revised edition—Wiley (1967), volume 12, pp. 837–849, which also indicates an extensive variety of uses for malic acid.

Bright tobacco stems are a by-product of tobacco processing, and a large part of them are discarded. They are known to contain significant amounts of *l*-malic acid, sometimes as much as 7 or 8% by weight. However, no commercially useful procedure has been reported for its isolation from this source. Ordinary extraction procedures produce the acid contaminated with large proportions of pectins which are not readily separated.

The present invention involves a process for isolating *l*-malic acid from what is generally considered waste tobacco material.

In carrying out the process of the invention, no specialized equipment is needed. Tobacco parts, for example, stems are steeped in an aqueous medium at a temperature of about 60° to about 105° C., but preferably at approximately boiling temperature of the extract for about 15 to 20 minutes and the extract is then separated by filtration. The extraction step may best be carried out using the least amount of water capable of extracting the desired material. Generally about equal parts of water and stems will achieve the purpose whether an open or closed system is used. With a closed system under pressure, a higher temperature may be used, and, of course, a shorter extract time. While only one extraction is described here as essentially adequate, one may repeat the extraction of the tobacco stems to increase the yield of the desired product.

The extract or extracts, at a pH of about 5.5 to 6.0, or adjusted thereto as necessary with acid or base, contains water soluble pectins and essentially all of the malic acid content of the stems. The extract is then treated to hydrolyze the pectin content by enzymatic hydrolysis or de-esterification using a pectinase enzyme.

The pectinase enzyme may be any commercially available enzymatic material capable of hydrolyzing pectins and may even include other enzymes in admixture. These enzymes are generally derived from either bacterial cultures, fungal sources, or the treatment of plant extracts as generally described, for example, in Pat. No. 3,240,214 to Bavley et al. A suitable high-content pectinase enzyme that is commercially available may be identified as "Pectinol" (Rohm & Haas pectinase) and is particularly effective for present purposes. About 0.4 to about 0.5 gram of enzyme per 100 grams of tobacco will be sufficient to effect hydrolysis of the pectins.

The enzymatic treatment of the extract is carried out at a temperature range from room temperature to about 50° C. At room temperature with moderate stirring de-esterification of pectins will take place in about 2 to 4 hours. At the higher temperatures, the desired action can be completed from about 1 to 2 hours. On completion of the enzyme treatment, the extract and enzymatic products are acidified to a pH of from about 0.5 to about 1.5, a pH of about 1.0 being preferred to precipitate the pectinic acids and degradation products. Any mineral acid which would not tend to contaminate the product could be used, hydrochloric acid being preferred.

After the acidification and precipitation step, decolorization may be carried out by the addition of activated charcoal or other known decolorizing substances, for example, that sold by Atlas Chemical Co. as "Darco," followed by filtration to remove the pectinic products.

The clarified filtrate is now neutralized to a pH of about 5.5 to 6.5, preferably a pH of approximately 6.0 with an alkaline earth metal oxide or hydroxide, slaked lime being preferred. The latter produces a precipitate of calcium *l*-malate which is essentially free of pectinaceous substances but may contain occluded inorganic salts and some calcium citrate. The calcium malate precipitate is separated, preferably by filtration, washed and, if desired, subjected to conventional purification procedures to obtain substantially pure calcium *l*-malate. Acidification of the salt to *l*-malic acid may be carried out if the acid is desired.

The above procedure may be modified following the extraction step or steps by a preliminary chemical hydrolysis prior to the enzyme de-esterification step. Thus, the aqueous extract may be treated with an alkali metal hydroxide, preferably sodium hydroxide, to a pH of about 9.5 to about 11.0, preferably a pH of approximately 10, and the mixture boiled for sufficient time, usually about an hour at refluxing temperature, to hydrolyze at least a portion of the pectins. This step does not take the place of enzymatic de-esterification, however, and is essentially only an adjunct to the treatment with pectinase.

The following examples are given for illustrative purposes only and are not to be deemed as limitative of the scope of the invention.

EXAMPLE 1

Bright tobacco stems, cut in short lengths, weighing 500 g. were extracted with 500 ml. portions of boiling water with filtration through glass wool. To the combined filtrates was added 20 g. of sodium hydroxide. The solution was boiled 1 hour under reflux, cooled, and the pH adjusted to about 6.0 with conc. HCl. The enzyme "Pectinol" 10D (Rohm & Haas pectinase) (5 g.) was added and moderate stirring continued for 3 hours. After filtration through glass wool and #1 paper by means of vacuum, the filtrate was concentrated by heating, to about 500 ml. Addition of 50 ml. of conc. HCl and 100 g. of decolorizing carbon ("Darco" G–60, Atlas Chemical Co.) was followed by filtration and washing of the filter cake with dilute (1:10) HCl. The filtrate was concentrated to about 300 ml. by boiling and pH was then brought to approximately 6.0 with a lime slurry added while heating was continued just below the boiling point. The mixture was left overnight and filtered. Concentration of the filtrate by boiling and cooling gave a second crop of product. Total calcium salt precipitate was washed with water and dried, weight 22.1 g.

The calcium $l$-malate content of the product was assayed at 69.5%. The standard analytical procedure used was as follows:

Malic, citric and oxalic acids are simultaneously extracted and methylated with sulfuric acid in absolute methanol from a dry, ground sample of tobacco, or from the calcium salts. The methyl esters formed from the acids are extracted into chloroform. Readout is by gas chromatography and samples are compared with acid standards treated identically from prepared standard curves made with each run of samples.

To prepare standard curves, make duplicate 4-$\mu$l. injections of each dilute standard acid solution. Operate a standard flame ionization vapor phase chromatograph having controlled injection port, detector, and column temperature isothermally at 125° C. and X16 attenuation for oxalic acid. Raise the column temperature to 210° C. and operate isothermally at X16 attenuation for malic acid and X8 attenuation for citric acid. Plot peak height in mm. versus concentration in mg./ml. for each acid.

The calculation of the percentage of acid yield, for example, malic acid, is made by dividing the concentration of acid found in ml./mg., multiplied by 10,000 and divided by the number of grams of sample tested.

EXAMPLE 2

As in the preceding example, 500 g. of bright tobacco stems was extracted with five 600 ml. portions of boiling water and then filtered. The pH of the filtrate was 6.0. About 2 g. of "Pectinol" 10D was added to the filtrate at room temperature and it was stirred 3 hours. Concentration by slow boiling to about 1 liter was followed by acidification with 50 ml. of conc. HCl and addition of 50 g. of "Darco" G–60 activated carbon. After filtering the liquid was heated to boiling and treated with a slurry of lime until the pH was 6.0. After boiling to about 900 ml. a first crop of product was filtered off; a second crop was recovered at about 400 ml. The second corp, weighing 26.4 g., analyzed at 85% calcium malate, a yield of 41%. Additional product could be isolated from the first crop, which assayed at a low malate content and presumably contained some pectinaceous material.

An alternate route to malic acid recovery from bright tobacco stems is illustrated by the following example.

EXAMPLE 3

A solution of 10% vol./vol. sulfuric acid in methanol was prepared. A 700 g. batch of cut stems was treated with 1800 ml. of this solution about 18 hours, filtered, and the stems washed twice with 500 ml. portions of the solution. The total solution was diluted with an equal volume of water and extracted with 3000 ml. of chloroform. This extract was evaporated until free of chloroform. The residue weighed 64.7 g., exactly equivalent to the malic acid known to be present. It was distilled through a Vigreux distillation column at a reduced pressure of about 0.5 mm. mercury. Dimethyl oxalate first sublimed into the receiver. The condenser and receiver were opened and rinsed with acetone. The distillation was resumed at the same pressure and distillate collected until at a head temperature of 110° C. solid condensate began to appear (presumably trimethyl citrate). The distillate weighed 30.0 g. Saponification equivalent of 84.5 (theor. 81) and chromatographic response indicated that this fraction was not pure dimethyl malate. Conversion via lime to the calcium salt gave 79.9% of the calculated weight; this corresponds to a yield of 40% from the known malic acid content.

The invention claimed is:

1. A process for isolating $l$-malic acid or a derivative thereof from tobacco parts comprising
    (a) extracting tobacco parts with an aqueous medium under boiling conditions to obtain water-solubles comprising malic acid or derivatives thereof and water-soluble pectins;
    (b) separating the liquid extract from the solid extracted material;
    (c) adding a pectinase enzyme to the filtrate and holding the mixture at from room temperature to about 50° C. for sufficient time to de-esterify the water-soluble pectins therein;
    (d) acidifying the liquid enzymatic mixture to about pH 1 to precipitate pectinic solids;
    (e) filtering out undesired solids;
    (f) neutralizing the filtrate obtained to about pH 6 with an agent selected from the group consisting of an alkaline earth metal oxide and hydroxide to precipitate $l$-malic acid as an alkaline earth metal salt; and then
    (g) isolating said salt from the filtrate as a product of the process.

2. The process of claim 1 in which the tobacco material extracted is bright tobacco stems.

3. The process of claim 1 in which enzymatic action is carried out substantially at room temperature.

4. The process of claim 1 in which the enzymatic action is carried out at about 50° C.

5. The process of claim 1 in which the liquid enzymatic mixture of step (d) is treated with decolorizing agent prior to the filtration step.

6. The process of claim 1 in which the aqueous extract separated from the solid extracted material is subjected to alkaline hydrolysis prior to enzymatic de-esterification of pectins.

7. The process of claim 1 in which the neutralizing agent is lime and the product obtained thereby is calcium $l$-malate.

8. The process of claim 1 in which the alkaline earth metal salt is reacted with acid to form $l$-malic acid.

References Cited

UNITED STATES PATENTS

| | | | |
|---|---|---|---|
| 2,204,621 | 6/1940 | Rader | 260—527 |
| 3,256,888 | 6/1966 | De La Burdé | 195—2 |

FOREIGN PATENTS

| | | | |
|---|---|---|---|
| 1,127,849 | 4/1962 | Germany | 260—527 |

LORRAINE A. WEINBERGER, Primary Examiner

V. GARNER, Assistant Examiner

U.S. Cl. X.R.

195—2; 260—484 P, 485 R